United States Patent [19]
Schneider et al.

[11] Patent Number: 5,267,472
[45] Date of Patent: Dec. 7, 1993

[54] METHOD AND ARRANGEMENT FOR DETERMINING THE PERFORMANCE LOSS OF A CATALYZER

[75] Inventors: Erich Schneider, Kirchheim; Eberhard Schnaibel, Hemmingen, both of Fed. Rep. of Germany

[73] Assignee: Robert Bosch GmbH, Stuttgart, Fed. Rep. of Germany

[21] Appl. No.: 870,263

[22] Filed: Apr. 17, 1992

[30] Foreign Application Priority Data

Apr. 17, 1991 [DE] Fed. Rep. of Germany ....... 4112478

[51] Int. Cl.$^5$ .......................................... G01M 15/00
[52] U.S. Cl. ..................... 73/118.1; 60/277
[58] Field of Search .................. 73/118.1; 60/277; 123/672

[56] References Cited

U.S. PATENT DOCUMENTS

| 3,962,866 | 6/1976 | Neidhard et al. | 60/276 |
| 5,154,055 | 10/1992 | Nakane et al. | 60/277 X |
| 5,159,810 | 11/1992 | Grutter et al. | 60/277 X |

FOREIGN PATENT DOCUMENTS 3500594 7/1986 Fed. Rep. of Germany .

Primary Examiner—Jerry W. Myracle
Attorney, Agent, or Firm—Walter Ottesen

[57] ABSTRACT

The invention relates to a method for determining the performance loss of a catalyzer receiving the exhaust gas of a lambda-controlled internal combustion engine and includes the steps of: measuring lambda values forward and rearward of the catalyzer to obtain forward and rearward lambda values, respectively; when a control oscillation of the forward lambda value makes a transition from rich to lean or from lean to rich, determining if the rearward lambda value makes a transition corresponding to the transition of the forward lambda value, and if this correspondence takes place, then carrying out the following additional steps: determining the gas mass flow flowing through the catalyzer; computing the time integral of the product of the gas mass flow and the forward lambda value; computing the time integral of the product of the gas mass flow and the rearward lambda value; and, as a measure of the performance loss of the catalyzer, utilizing either the difference between the integrals or the quotient of the integrals or the quotient of the difference and one of the integrals. The method of the invention affords the advantage that determinations are only undertaken when it is ensured that the catalyzer is entirely filled with oxygen or is completely emptied in advance of a measurement. This achieves well defined starting relationships. Furthermore, the advantage is provided that with the evaluations, gas-mass flows are considered which permits the storage capacity of the catalyzer for oxygen to be directly determined. This oxygen storage capacity is the variable decisive in the practice for determining the state of deterioration of the catalyzer.

4 Claims, 2 Drawing Sheets

METHOD AND ARRANGEMENT FOR DETERMINING THE PERFORMANCE LOSS OF A CATALYZER

FIELD OF THE INVENTION

The invention relates to a method and an arrangement for determining the performance loss (state of deterioration) of a catalyzer to which the exhaust gas of a lambda-controlled internal combustion engine is supplied.

BACKGROUND OF THE INVENTION

It has long been known that the performance loss of a catalyzer can be evaluated with the signal of a lambda probe mounted rearward of the catalyzer. As long as the catalyzer has deteriorated only slightly, the catalyzer provides a good storage capacity for oxygen which enables the catalyzer to store oxygen in the lean phases of a lambda control to the value one and to release this oxygen in rich phases. In this way, the lambda value one is continuously measured at the output of the catalyzer. However, with increasing deterioration of the catalyzer, this storage capacity of the catalyzer is reduced so that the catalyzer can no longer store all the oxygen which is supplied in the above-mentioned lean phase. This leads to the condition that after some time in the lean phase, oxygen is present in the exhaust gas leaving the catalyzer which causes the lambda probe mounted rearward of the catalyzer to provide a lean signal. In the opposite case, there is not enough oxygen present in the rich phase in order to convert the total incoming quantity of toxic components to be oxidized. For this reason, after some time in the rich phase, the lambda probe rearward of the catalyzer measures components to be oxidized. Because of the control-conditioned signal trace of the lambda value forward of the catalyzer, the amplitude of the lambda value signal (as it is measured rearward of the catalyzer) is dependent upon the time point at which the oxygen store overflows or is entirely empty. The earlier the time point lies, the greater is the amplitude of the signal measured rearward of the catalyzer (assuming that the time point does not lie excessively early). The amplitude of the signal rearward of the catalyzer is then a measure for the storage capacity and therefore of the performance loss of the catalyzer.

The above-mentioned amplitude does not only depend on the storage capacity of the catalyzer, but also on the amplitude of the lambda value signal measured forward of the catalyzer. To compensate for this influence, it is known to form a relationship of the lambda values measured forward and rearward of the catalyzer. For this purpose, U.S. Pat. No. 3,962,866 teaches to form the difference between the two above-mentioned signals and to emit a warning signal when the difference drops below a threshold value. On the other hand, German published patent application 3,500,594 teaches to form the ratio of the above-mentioned signals and to use a mean value of this ratio in order to evaluate the state of deterioration of the catalyzer.

Notwithstanding the above-mentioned corrective measures, it has until now been possible only in especially selected operating conditions to determine the state of deterioration of the catalyzer with the above-mentioned methods. The reason for this can be derived from the above-mentioned storage capacity of the catalyzer. If, for example, there is no control precisely to the lambda value one in an operating condition but instead to a richer value which is often the case, the lean phases are shortened relative to the rich phases. Under certain circumstances, not as much oxygen can be stored in the lean phase as the catalyzer would actually still be able to store. In the rich phase, this leads to an especially large amplitude of the lambda value signal measured rearward of the catalyzer. Similar effects occur when the lean phase is shortened for another reason, for example, because a change of the controller frequency or of non-steady-state operation.

SUMMARY OF THE INVENTION

In view of the foregoing, it is an object of the invention to provide a method and an arrangement for evaluating the state of deterioration of a catalyzer wherein the influence of operating conditions on the computed performance loss value is as low as possible.

The method of the invention is for determining the performance loss of a catalyzer receiving the exhaust gas of a lambda-controlled internal combustion engine. The method includes the steps of: measuring lambda values forward and rearward of the catalyzer to obtain forward and rearward lambda values, respectively; when a control oscillation of the forward lambda value makes a transition from rich to lean or from lean to rich, determining if the rearward lambda value makes a transition corresponding to the transition of the forward lambda value, and if this correspondence takes place, then carrying out the following additional steps: determining the gas mass flow flowing through the catalyzer; computing the time integral of the product of the gas mass flow and the forward lambda value; computing the time integral of the product of the gas mass flow and the rearward lambda value; and, as a measure of the performance loss of the catalyzer, utilizing either the difference between the integrals or the quotient of the integrals or the quotient of the difference and one of the integrals.

The arrangement of the invention is for determining the performance loss of a catalyzer receiving the exhaust gas of a lambda-controlled internal combustion engine and includes: a lambda probe mounted forward of the catalyzer for measuring the forward lambda value; a lambda probe mounted rearward of the catalyzer for measuring the rearward lambda value; an airflow sensor mounted in the intake pipe of the engine; computation means for computing the time integral of the product of the gas mass flow and the forward lambda value and for computing the time integral of the product of the gas mass flow and the rearward lambda value and, the computation means being adapted to specify either the difference between the integrals or the quotient of the integrals or the quotient of the difference and one of the integrals as a measure of the performance loss of the catalyzer; and, decision means for determining when a control oscillation of the forward lambda value makes a transition from rich to lean or from lean to rich, if the rearward lambda value makes a transition corresponding to the transition of the forward lambda value, and the decision means being adapted for driving the computation means to perform the above computation when the correspondence takes place.

The method according to the invention and the arrangement according to the invention distinguish over the state of the art in at least two aspects. One important difference is that the computations of the performance loss of the catalyzer are only then undertaken when it is ensured that the catalyzer is completely filled with oxygen for a control oscillation of the lambda value forward of the catalyzer and, thereafter, is again completely emptied or vice versa. In this way, precisely defined relationships are present for evaluating the storage capacity of the catalyzer. The second important difference is that not only time-dependent mean values of the lambda value are evaluated but instead, time-dependent integrals of products of gas-mass flows and lambda values are also evaluated. This is based on the realization that at constant (lean) lambda value, the catalyzer can be filled much faster with oxygen the greater the quantity of gas flowing therethrough. The time point at which the catalyzer is filled and therefore the lambda value measured at the output of the catalyzer is dependent not only on the lambda value at the input but also on the gas-mass flow.

It is advantageous to delay the determination of the performance loss when the amount of the time-dependent integral derived from the gas-mass flow and lambda value forward of the catalyzer exceeds a limit value. In this way, determinations are for example not permitted directly after an overrun phase of operation. In this case, a following rich phase must be awaited before a new computation of the performance loss can be undertaken. In the overrun phase without fuel injection, the storage capacity of the catalyzer is approximately 1.5 to two times greater than the lambda values as they usually occur in lambda control. The above-mentioned condition then prevents that special conditions falsify the determination of the performance loss.

Devices for detecting the air mass in the intake pipe of the engine are known for every lambda controlled engine. It is advantageous to use these devices for determining the gas-mass flow which flows through the catalyzer. This is done because for a lambda controlled engine, the fuel is measured essentially proportionally to the air-mass flow and, accordingly, the gas-mass flow at the output of the engine and therefore at the input of the catalyzer is essentially proportional to the inflowing air-mass flow.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
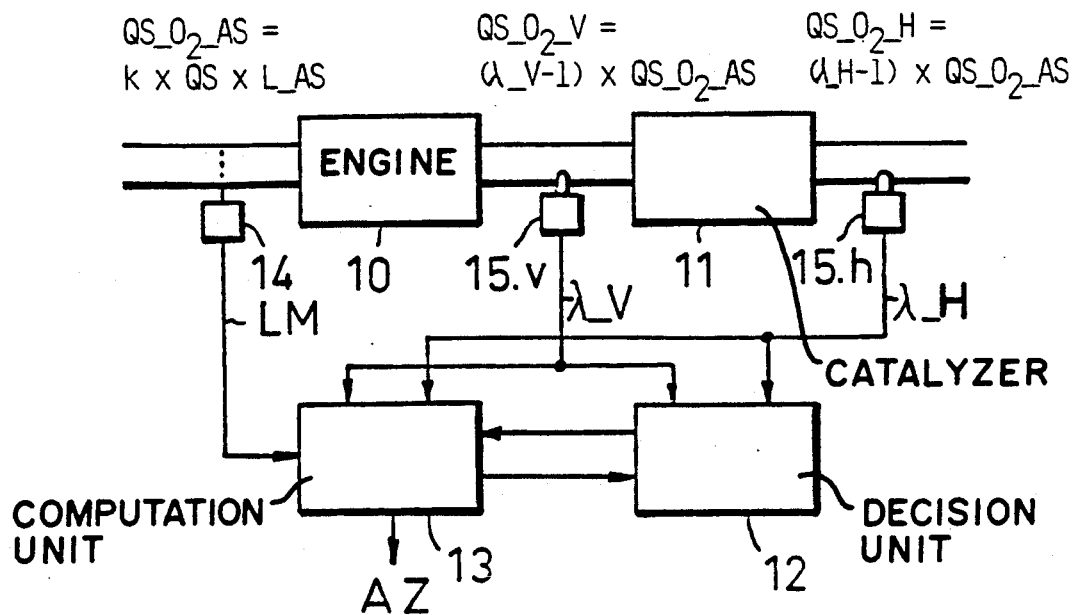
FIG. 1 is a schematic of an internal combustion engine having a catalyzer connected downstream thereof as well as functional means for determining the state of deterioration of the catalyzer.

FIG. 1 shows an internal combustion engine 10, a catalyzer 11, a decision unit 12 and a computation unit 13. An air-flow sensor 14 is mounted in the intake pipe of the engine 10 and provides an air-mass flow signal LM to the computation unit 13. A forward lambda probe 15.v is mounted forward of the catalyzer 11 in the exhaust gas pipe between the engine 10 and the catalyzer 11; whereas, a rearward lambda probe 15.h is provided at the outlet of the catalyzer. The lambda value signals $\lambda\_V$ and $\lambda\_H$ from these two probes, respectively, are supplied to the decision unit 12 as well as to the computation unit 13. The computation unit 13 emits a signal AZ which is a measure for the state of deterioration of the catalyzer 11.

In FIG. 1, values for gas-mass flows are also shown. Here, $QS\_L\_AS$ is the air-mass flow measured by the air-flow sensor 14. The corresponding oxygen flow is identified as $QS\_O_2\_AS$. The oxygen flow is related to the air-mass flow via a proportionality constant k (21 mol percent) which remains essentially unchanged up to high elevations. The oxygen partial flow which leaves the engine 10 is dependent upon the inducted oxygen flow and on the difference between $\lambda\_V$ to the lambda value one. The lambda value one means that the total quantity of oxygen has been consumed so that the exiting oxygen partial flow has the value zero. If the difference between $\lambda\_V$ and one is greater than zero (that is a lean combustion is present) an oxygen flow into the catalyzer is computed as $(\lambda\_V-1) \times QS\_O_2\_AS$. This variable takes on a negative value for rich combustion. This means that oxygen is withdrawn from the catalyzer instead of being added in accordance with the corresponding flow values. A corresponding relationship, namely $(\lambda\_H-1) \times QS\_O_2\_AS$ applies also for the oxygen partial flow rearward of the catalyzer which, in turn, can be an oxygen conducting flow or a flow from which oxygen has been consumed. The oxygen partial flow to the catalyzer 11 is identified in the following also as $QS\_O_2\_V$; whereas, the partial flow rearward of the catalyzer is identified as $QS\_O_2\_H$.

Figure 2:
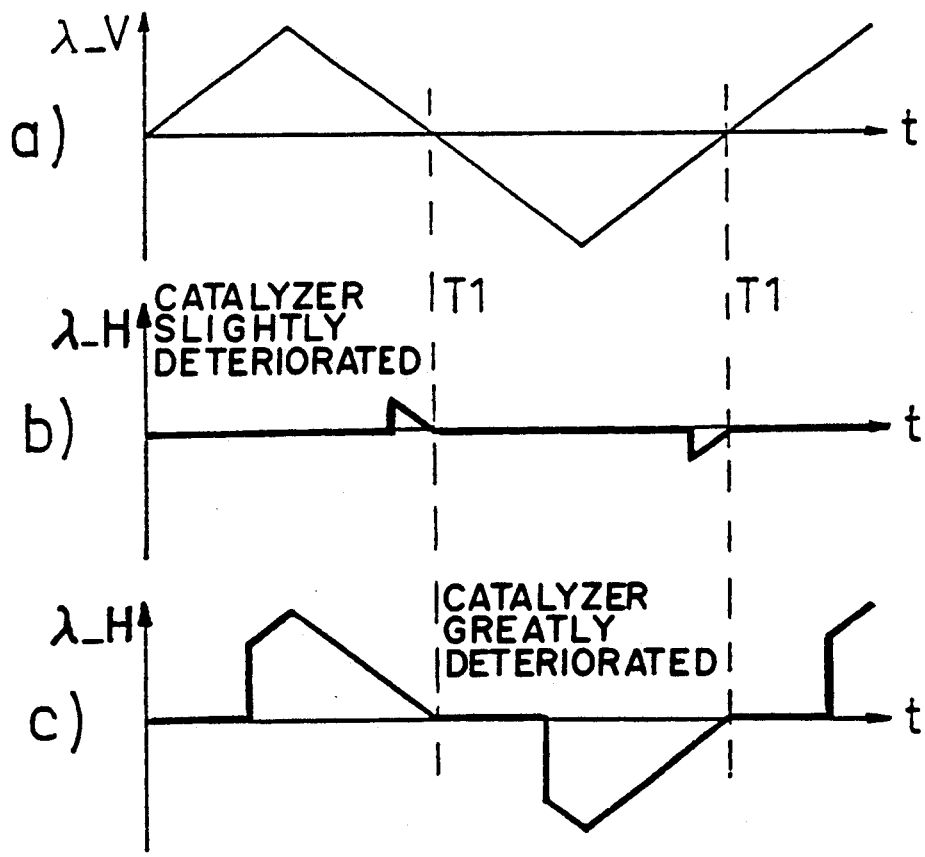
FIGS. 2a to 2c show three time-correlated diagrams of the time-dependent traces of: the lambda value signal forward of the catalyzer shown in FIG. 2a; the lambda signal value rearward of a slightly deteriorated catalyzer in FIG. 2b; and, the lambda value signal rearward of a greatly deteriorated catalyzer in FIG. 2c; and, FIG. 3 is a flowchart showing the method of the invention for determining the performance loss of a catalyzer which utilizes the integrals from gas-mass flows and lambda values.

FIG. 2a shows a time-dependent trace of the lambda value $\lambda\_V$ forward of the catalyzer for a uniform oscillation about the lambda value one. At time point T1, a transition from lean to rich takes place whereas at time point T1', the reverse transition from rich to lean takes place. The curve is shown as a triangular curve which means that, for the sake of simplicity, the assumption is made that the lambda control operates exclusively with integral components and that the signal form of the lambda value signal is not falsified with respect to the signal form of the fuel quantity signal which is adjusted with the lambda control. These conditions apply for practical cases only with very coarse approximation, however, the concrete signal trace is unimportant for the following evaluation.

The area between the drawn-in curve and the lambda value one corresponds to the time-dependent integral $(\lambda\_V-1) \times dt$. If the inducted air-mass flow is assumed to be constant, then the area also corresponds to the integral $\int QS\_O_2\_V \times dt$. In this way, the areas between the time points T1' and T1 equal the oxygen quantity flowing into the catalyzer; whereas, the areas between the time points T1 and T1' correspond to that oxygen quantity which is needed in order to oxidize the oxidizable gas components flowing into the catalyzer in this time duration.

As long as the catalyzer can store more oxygen than is supplied thereto during a lean phase and, during a rich phase, only the oxygen which was previously supplied is again withdrawn, then the lambda value $\lambda\_H$ at the output of the catalyzer remains continuously at the value one. However, in FIG. 2b, it is assumed that the catalyzer is already slightly deteriorated so that the catalyzer is no longer able to store all the oxygen supplied in the lean phase. It is furthermore assumed for the sake of clarity that the oxygen store is filled suddenly which causes the condition that starting at the instant of its filling, the lambda value signal $\lambda\_H$ at the output corresponds to the signal $\lambda\_V$ at the input of the catalyzer. For the removal of the catalyzer, it is correspondingly assumed that the storage is suddenly empty and that the signal $\lambda\_H$ corresponds to the signal $m\_V$. The areas between the signal regions generated in this way and the line for the lambda value one correspond with the assumed constant air-mass flow to the oxygen excess flow or removal flow in the manner explained above. The areas correspond to the integrals $\int Q\_S\_O_2\_H \times dt$.

FIG. 2c shows a case corresponding to that of FIG. 2b, namely, the trace of the signal $\lambda\_H$ for a greatly deteriorated catalyzer instead of a slightly deteriorated catalyzer. For a greatly deteriorated catalyzer, the oxygen storage capacity is greatly reduced and, for this reason, the signal $\lambda\_H$ in the case of FIG. 2c jumps considerably earlier to the value of $\lambda\_V$ than in the case of FIG. 2b.

The difference of $\int QS\_O_2\_V \times dt - \int Q\_S\_O_2\_H \times dt$ corresponds to the oxygen quantity stored in the lean phase in the catalyzer or the oxygen quantity removed in the rich phase from the catalyzer. This difference is therefore directly a measure for the storage capacity and therefore for the deterioration state of the catalyzer. This relationship applies for any desired time traces of signal $\lambda\_H$ and of the inducted air-mass flow as long as, for each phase change of the signal $\lambda\_V$, also a phase change of the signal $\lambda\_H$ takes place. If such a phase change is missing, then the storage capacity cannot be determined since it is unclear how far the store has been filled in a lean phase or how much the store has been emptied in a rich phase. Because of the independence of the above-mentioned variable on the time-dependent traces of the lambda value and of the air-mass flow, this variable for evaluating the state of deterioration is largely independent of operating conditions and operating condition changes taking place during the measurement. Problems occur only in special operating conditions such as in the overrun phase without fuel injection since in this phase, the catalyzer stores considerably more oxygen than during a controlled lean phase namely, by approximately a factor of 1.5 to 2. In order to prevent erroneous determinations because of such special operating conditions, it is advantageous not to form the above-mentioned variable when the integral of the lambda value forward of the catalyzer and the air-mass flow exceeds a limit value.

Figure 3:
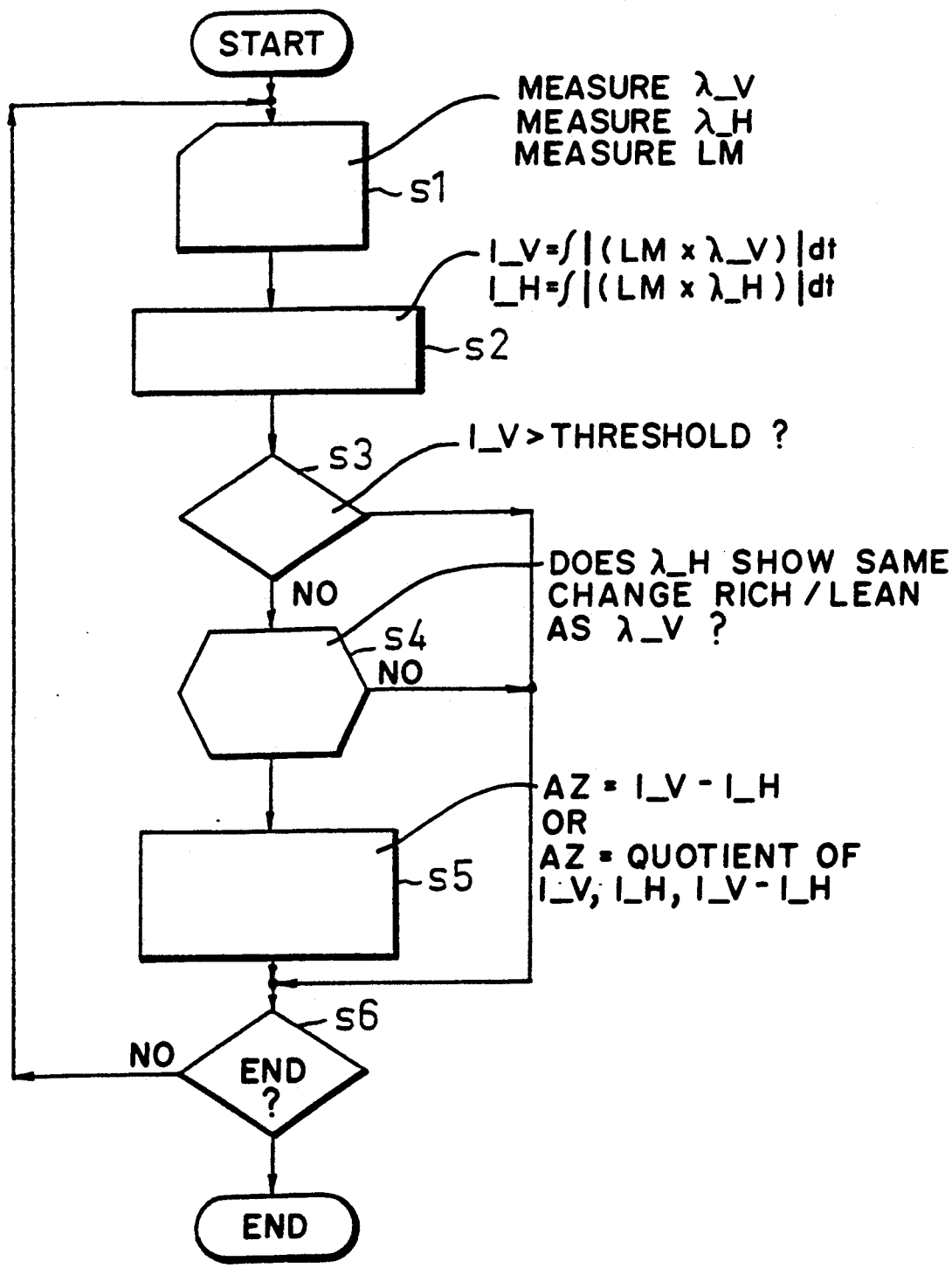

In FIG. 3, a method is explained which utilizes the above-described principles. In a step s1, the lambda values $\lambda\_V$, $\lambda\_H$ and the air-mass flow LM are measured. Thereafter, in step s2, integrals $I\_V$ and $I\_H$ are formed as shown in FIG. 3. In a decision step s3, an investigation is made as to whether the integral value $I\_V$ lies above a threshold. In the embodiment, this threshold is so dimensioned that it corresponds to three times the actual value of the storage capacity of the catalyzer. If this condition is not fulfilled, the question is asked in a further decision step s4 as to whether the signal $\lambda\_H$ shows the same change from rich to lean or vice versa as the signal $\lambda\_V$. If this is the case, a performance loss variable AZ is computed from the difference between the above-mentioned two integrals or as any desired quotient of two of the quantities $I\_V$, $I\_H$ and $I\_V - I\_H$ (step s5). Thereafter, in step s6, an investigation is made as to whether the method should be ended. If this is not the case, the operations run again starting with step s1. This inquiry step is also reached starting from step s3 if the threshold for $I\_V$ is exceeded or, starting from step s4, if the signal $\lambda\_H$ does not show the same change as $\lambda\_V$.

In the embodiment shown in FIG. 1, the assumption is made that the decision steps s3 and s4 take place in the decision unit 12 and that the other steps take place in the computation unit 13 and that the two units exchange those data which they mutually require. Actually, these devices are realized by functions of a correspondingly programmed microcomputer.

It is understood that the foregoing description is that of the preferred embodiments of the invention and that various changes and modifications may be made thereto without departing from the spirit and scope of the invention as defined in the appended claims.

What is claimed is:

1. A method for determining the performance loss of a catalyzer receiving the exhaust gas of a lambda-controlled internal combustion engine, the method comprising the steps of:

measuring lambda values forward and rearward of the catalyzer to obtain forward and rearward lambda values, respectively;

when a control oscillation of the forward lambda value makes a transition from rich to lean or from lean to rich, determining if the rearward lambda value makes a transition corresponding to the transition of the forward lambda value, and if this correspondence takes place, then carrying out the following additional steps:

determining the gas mass flow flowing through the catalyzer;

computing the time integral of the product of the gas mass flow and the forward lambda value;

computing the time integral of the product of the gas mass flow and the rearward lambda value; and, as a measure of the performance loss of the catalyzer, utilizing either the difference between said integrals or the quotient of said integrals or the quotient of said difference and one of said integrals.

2. The method of claim 1, wherein the air-mass flow flowing into the engine is measured; and, the gas mass flow flowing through the catalyzer is considered as being proportional to the air-mass flow.

3. The method of claim 1, wherein the performance loss is not determined when the amount of said time integral of the gas mass flow and the forward lambda value exceeds a limit value.

4. An arrangement for determining the performance loss of a catalyzer receiving the exhaust gas of a lambda-controlled internal combustion engine having an intake pipe, the arrangement comprising:

a lambda probe mounted forward of the catalyzer for measuring the forward lambda value;

a lambda probe mounted rearward of the catalyzer for measuring the rearward lambda value;

an air-flow sensor mounted in the intake pipe of the engine;

computation means for computing the time integral of the product of the gas mass flow and the forward lambda value and for computing the time integral of the product of the gas mass flow and the rearward lambda value and, said computation means being adapted to specify either the difference between said integrals or the quotient of said integrals or the quotient of said difference and one of said integrals as a measure of the performance loss of the catalyzer; and, decision means for determining when a control oscillation of the forward lambda value makes a transition from rich to lean or from lean to rich, if the rearward lambda value makes a transition corresponding to the transition of said forward lambda value, and said decision means being adapted for driving said computation means to perform the above computation when said correspondence takes place.

* * * * *